United States Patent [19]

Domnick

[11] 4,105,561
[45] Aug. 8, 1978

[54] DIRECTIONAL FILTER

[75] Inventor: Keith Raphael Domnick, East Boldon, England

[73] Assignee: Domnick Hunter Engineers Limited, United Kingdom

[21] Appl. No.: 547,454

[22] Filed: Feb. 6, 1975

[30] Foreign Application Priority Data

Feb. 16, 1974 [GB] United Kingdom ............... 7163/74

[51] Int. Cl.² ........................................... B01D 25/02
[52] U.S. Cl. .................................... 210/232; 210/444; 210/489
[58] Field of Search ............... 210/489, 509, 444, 497, 210/232

[56] References Cited

U.S. PATENT DOCUMENTS

| 3,158,532 | 11/1964 | Pall et al. ......................... 210/509 X |
| 3,186,552 | 6/1965 | Cutler .............................. 210/497 X |
| 3,241,679 | 3/1966 | Walter .................................. 210/444 |
| 3,290,870 | 12/1966 | Jensen ............................. 210/489 X |
| 3,327,864 | 6/1967 | Ball et al. ......................... 210/497 X |
| 3,556,304 | 1/1971 | Collard et al. ....................... 210/489 |
| 3,715,036 | 2/1973 | Hamer ............................. 210/489 X |
| 3,868,325 | 2/1975 | Otto ................................. 210/489 X |

Primary Examiner—Frank A. Spear, Jr.

[57] ABSTRACT

A filter having a microporous filter sleeve formed from fibres providing pore sizes below 50 microns, supported by a rigid support, and held at each end in a tapered channel in an end cap to compress the end zones of the sleeve. The end caps can be urged towards each other by a tie rod, extending between them, having a nut and screw arrangement. A porous sock may be provided downstream of the filter element, and this can be of plastic material, or of foamed metal, and combined with the rigid support.

11 Claims, 3 Drawing Figures

DIRECTIONAL FILTER

This inventions relates to improved filters of the kind comprising a microporous sleeve of filter medium, held in a sealed relationship with a housing, for the removal from fluid of particles and droplets of liquid having sub-micronic dimensions.

It has been proposed to clamp the ends of a tube of filter medium against end caps, with or without the interdisposition of gaskets or washers, for sealing the ends, and thus constraining the fluid to pass through the filter medium, and this has been proved adequate in the case of coarse filters e.g. having a filter medium retaining particles having dimensions of 50 microns and greater, but for finer discrimination e.g. for retaining particles having dimensions of 10 microns or less, and particularly of dimensions less than 1 micron, channelling takes place between the filter medium and the end cap or gasket causing errosion at the filter medium boundary and premature failure resulting in unfiltered fluid by-passing the affected filter medium.

According to the invention a filter comprises a tubular microporous layer of filter medium where the filter medium employs fibres providing a multiplicity of pores in a range of sizes substantially less than 50 microns, and which are reinforced with a binding material, the tubular layer of filter medium being held, in use, with the free end regions constrained in corresponding channels formed in or by at least one impermeable member at each end region at least partially defining a fluid flow path through the filter layer, the free end regions of the tubular layer of filter meduim being compressed when assembled in the channels whereby the filter layer forms an impermeable compression seal with the walls of the channels.

At least one side wall of each annular space is preferably inclined and the free ends of the filter layer are preferably correspondingly inclined on the inner and/-outer edges whereby an even fit is provided round the periphery of each end region when assembled and a longitudinal pressure in the filter tube is converted into a lateral compression of the filter tube wall.

The impermeable members preferably comprise a first end cap for closing one end of the filter tube and a second end cap having a port for fluid flow communicating with the interior of the filter tube when the second end cap is held against the other end of the filter tube.

It is an advantage of the invention that new end caps are not required in the provision of a replacement filter cartridge whenever the filter medium is replaced nor is the operation of sealing end caps to the filter medium necessary in the production of the filter cartridge. These measures also permit the production of an inexpensive filter cartridge and, in addition, a support for the filter medium layer may be provided as a part of the filter rather than it being necessary to incorporate the support, or supports, in the replacement filter cartridge.

A support for the filter medium is preferably located downstream of the filter medium in use and may be formed from perforated or expanded metal sheet material, for example, 26 gauge stainless steel or brass or cadmium coated mild steel and a further porous tube, e.g. an opened pored plastics foam sock is preferably employed as a postfilter to retain coalsced liquid droplets, for instance coalesced oil mist and condensed water vapour, downstream of the support.

The functions of the support tube and post-filter layer may be combined in one structure which is formed from an open pored metal foam in a tubular shape to enclose and support the filter tube downstream of the filter, in use, and also trap any coalesced droplets of liquid. The metal foam tube, preferably has a flexable gasket at each end seal the tube to the end caps.

In use it is preferable to employ a pre-filter, i.e. a fluid filter of coarser grade to remove larger particles which would tend to quickly clog the microporous filter layer and thus reduce its operating life. This pre-filter may be mounted in the same filter body as the microporous filter elements and is preferably of tubular form with an end cap which may or may not be permeable, and may be mounted coaxially of the microporous filter element upstream of the fluid flow in use, i.e. inside or outside the microporous filter tube depending on the normal direction of fluid flow.

A tie rod is preferably employed for providing an axial longitudinal compression force between the end caps. The tie rod may be secured at one end to one of the end caps passing through the other end cap, when assembled, with a nut screw engaged by a screw thread on the tie rod for urging the two end caps together and thus compressing the filter tube. A gasket is preferably employed between the nut and the end cap to enable a fluid tight seal to be obtained. Alternatively or in addition the tie rod may be secured to the filter housing passing, in use, through both end caps and having a nut screw engaged by a screw thread on the remote end for urging the end cap axially towards the filter housing. The embodiment with the tie rod secured to one end cap may be made up as a seperate filter cartridge which may be pre-assembled and secured in the filter housing at a later time by means of screw threaded or other coupling means.

Where high reverse pressure loadings are likely to be encountered, the microporous filter layer is preferably reinforced on the normally upstream side, for instance by a coil spring with a natural outside diameter slightly greater than the inside diameter of the filter tube.

The liquid aerosol droplets coalesced into bulk liquid on impact with the filter fibres and this bulk liquid is carried by the fluid flow through to the outer surface of the filter layer where it appears at randomly distributed points. The much greater pore size of the post-filter layer allows the bulk liquid carried off the microporous filter layer to seep down to the bottom of the foam layer where it forms a wet band, the excess liquid dropping off the filter assembly into a sump in the filter body from where it may be drained manually or automatically.

The porous material for the post-filter layer preferably has a high surface area for its volume, for instance the polyurethane and aluminium foam tubes have a surface area of approximately 2,000 sq. ft. per cubic foot.

The fibres employed in the filter medium layer are such as to provide the latter with a multiplicity of pores having a dimension in ranges of up to 50 microns and may be resin-reinforced by curing a pad of fibres impregnated with reinforcing resins such as epoxy or formaldehyde resin; the fibres may have diameters in ranges of up to 4 microns. The surface of the element normally in contact with the end caps is preferably moulded to obtain a high standard of surface smoothness.

The filter medium body, which is usually cylindrical, may be provided in several ranges of porosity for varying requirements, for example, a fine pores size having pores with a dimension in the range of 1 to 7 microns, intermediate pore sizes having pores in respective ranges of from 7 to 11 and of 11 to 24 microns and a small pore size having pores in the range of from 24 to 40 microns.

The fibres of the filter medium body are preferably non absorbent, i.e. fibres or chopped filaments having a low moisture regain usually less than 1.5% and preferably glass, e.g. borosilicate, fibre. The fibre must be very fine, but it is not necessary that the majority of the fibres are of the same order of size as the contaminent particles retained or the droplets which coalesced on them.

The fibres diameters of the filter medium body of fine pore size are preponderantly of the order of 0.5 microns, those of the filter medium bodies of intermediate pore size being preponderantly of respective orders of 1 and 2 microns whilst the fibre diameters of the filter medium body of small pores size having pores in the range of from 24 to 40 microns are preponderantly of the order of 4 microns.

It has been found that a filter medium cylinder of the small pores size removes 91% of contaminants having diemsions in the range of 0.05 to 2 microns whilst the filter medium sleeves having finer pores sizes remove over 99% of such contaminants, the fine pores size filter medium sleeve effecting virtually complete removal of 99.999%.

Preferred embodiments of the invention will now be described by way of example, with reference to the accompanying drawings, wherein.

Figure 1:
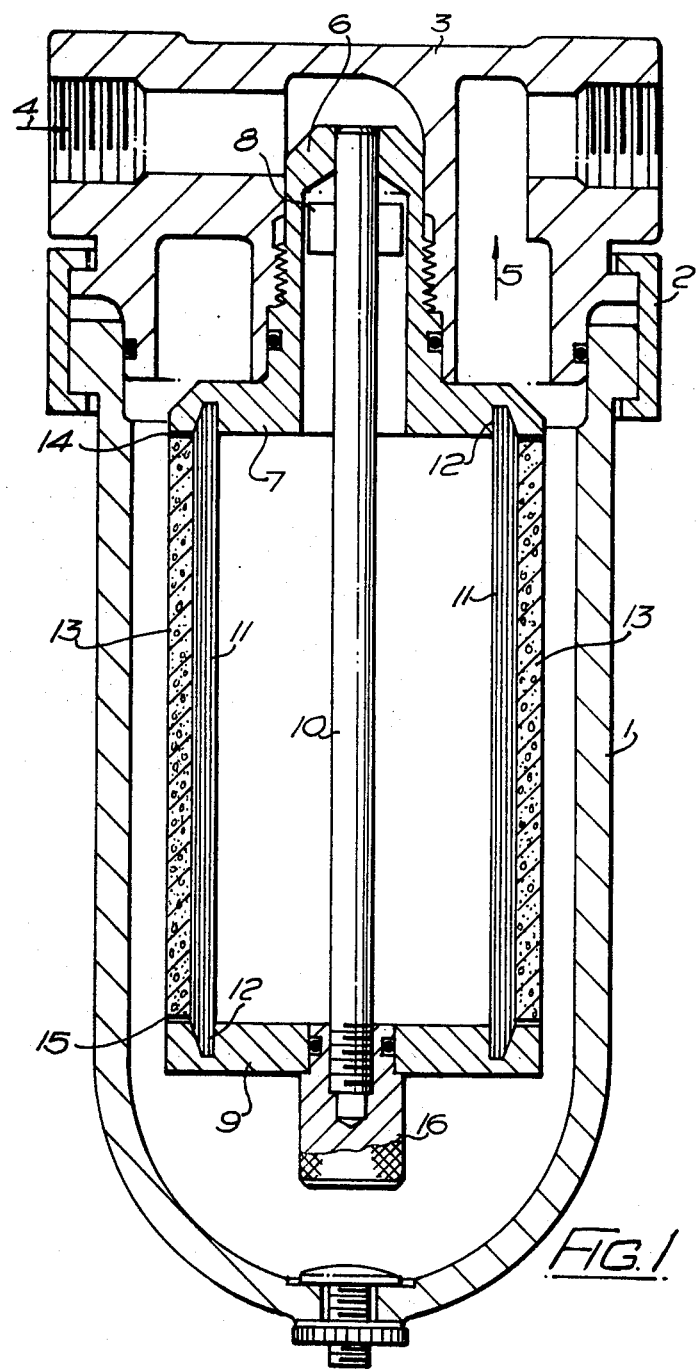
FIG. 1 is a sectional view of a filter housing incorporating a first embodiment of filter according to the invention.

The filter shown in FIG. 1 comprises a bullet shaped filter housing 1, secured, by a collar 2 to an inlet and outlet head 3, having an inlet passage 4 and an outlet passage 5 defined therein. A filter cartridge is mounted in the head 3 by means of a screw threaded boss 6 formed on an upper end cap 7 of the cartridge. The boss 6 has windows 8 which communicate between the inlet passage 4 and the interior of the boss, and of the filter cartridge. The cartridge also has a second, blind, end cap 9, which is connected by a tie rod 10 to the boss 6.

A filter element 11, in the form of a resin bonded microporous cylindrical sleeve providing a multiplicity of pores in a range from 11 to 24 microns, or alternatively in one of the ranges mentioned above is provided extending btween the end caps 7 and 9, and received in each end cap in a groove 12. The radially outer face of each groove 12 is inclined, so that the groove is narrower at its base than at its mouth. This has the effect in assembly, when the element 11 is pushed into the groove, the end of the element is compressed, causing the impregnating resin to fill the pores in the end region of the filter element 11, thus avoiding the risk of channeling at the ends. A further cylindrical sleeve 13, of porous formed metal is disposed around the element 11. This sleeve 13 acts as a mechanical support for the element 11 against the pressure of outward flow of the fluid being filtered from within the cartridge, to the surrounding space within the housing 1. The sleeve 13 also acts as a post filter for removing for example coalesced droplets of oil from the stream passing the filter element 11. Gasket type seals 14 and 15 are provided between the ends of the sleeve 13 and the respective end caps 7 and 9.

The tie rod 10 is received in a screw-nut 16, which is rotatable in end cap 9. Rotation of the nut 16 moves it either towards or away from the boss 6, thus increasing or decreasing the axial pressure on the filter element 11, and varying the compression of the ends of the element 11 in the grooves 12.

Figure 2:
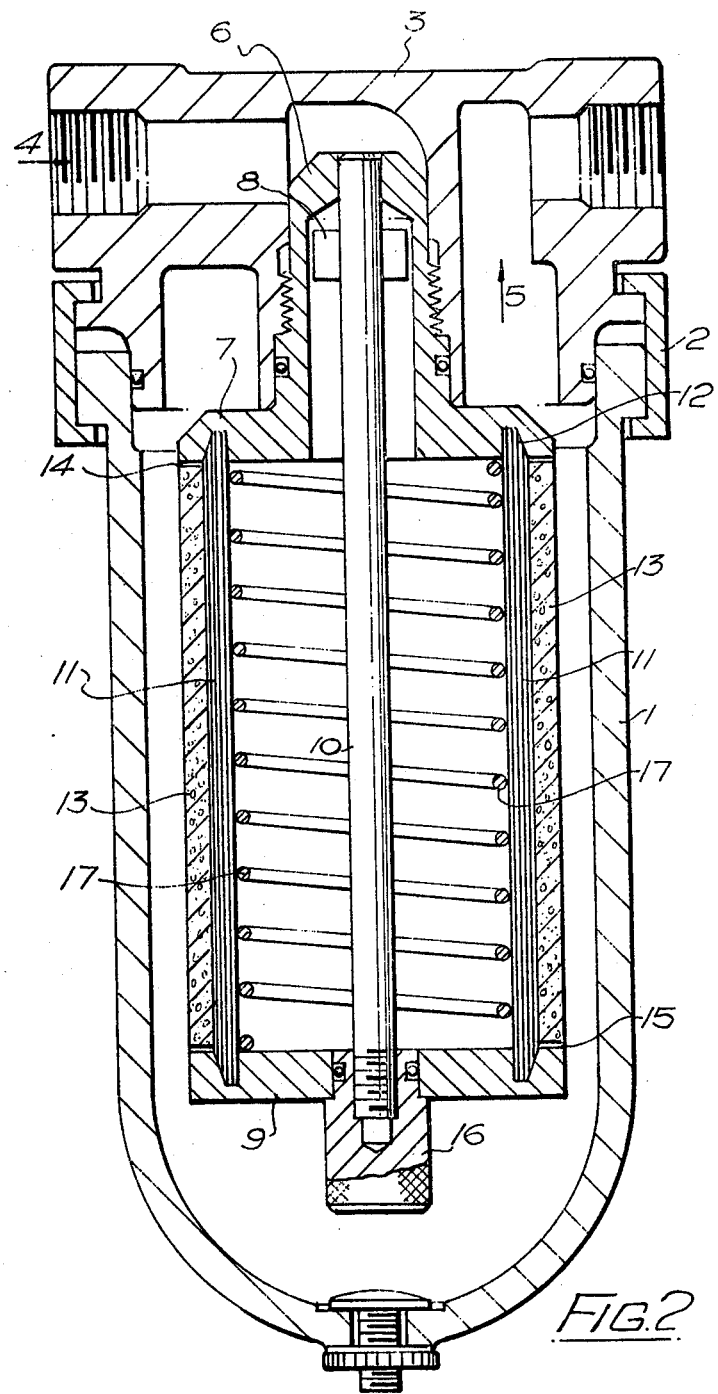
FIG. 2 is a similar sectional view, showing a second embodiment of filter according to the invention.

In FIG. 2 is shown an embodiment similar to FIG. 1 corresponding parts having the same reference numbers, wherein the filter element 11, besides being supported on the normally upstream side by the sleeve 13, is also supported on the normally downstream side by a coil spring 17, for protection of the filter element 11 against transient back pressures, which can arise in some phases of operation of a filter.

Figure 3:
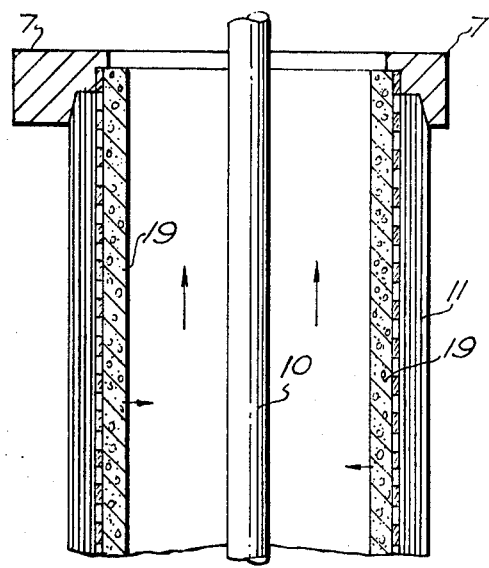
FIG. 3 is a diagrammatic partial sectional view illustrating a third embodiment of the filter according to the invention.
Figure 3:
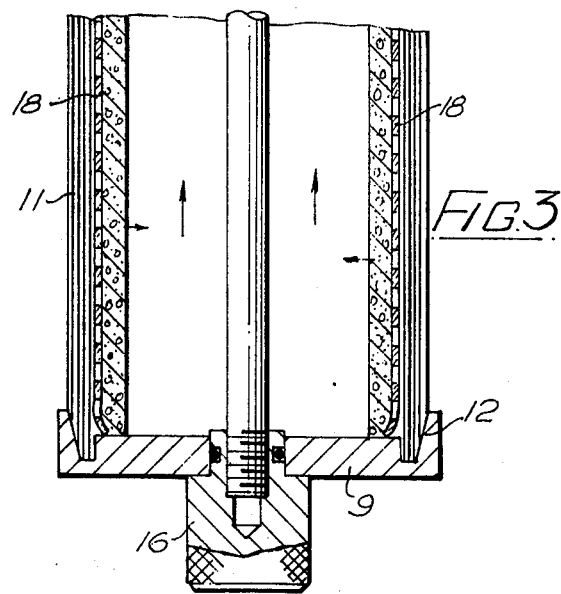

FIG. 3 diagrammatically illustrates a third embodiment designed for flow in the reverse direction through the filter housing, as shown by the arrows. The filter element 11 is supported internally, that is on the normally downstream side, by a cylindrical perforated sheet metal support 18. The support 18 is received at one end in a special recess in the end cap 7, and is deflected at the other end where it abuts the end cap 9 to give a degree of resilience to its support for the filter element 11. In the upper end cap 7, the filter element is held in a channel defined between the support 18 and the cap 7, whereas a proper channel 12 is provided in the lower end cap 9. A porous sock 19, which may be of porous sintered metal or a porous expanded plastics material is provided about the inner surface of support 18 to act as a post-filter.

Variations can be made to the constructional details of the filters within the scope of the invention. For example, in FIGS. 1 and 2, the porous metal sock may be replaced by a perforated sheet metal or perforated plastics sheet support, and the porous sock which is optional, may be of expanded plastics. On the other hand, a spring may be provided on the outside of the FIG. 3 embodiment, to guard against back pressures, or the spring may be replaced by a second support, so that the filter element is sandwiched between two supports, and the filter may then be made capable in functioning in both flow directions.

What I claim is:

1. A filter device comprising in combination: a self-supporting tubular microporous layer of a filter medium wherein the filter medium includes fibers providing a plurality of pores within a range of pore sizes substantially less than 50 microns; a binding material reinforcing said fibers; end caps of which each end cap defines an annular channel within a wall face thereof; one of said caps being at one end and another of said caps being at an opposite end of the tubular microporous layer mounted thereon; each end of the tubular microporous layer being held in a respective one of said annular channel against the channel-defining wall face thereof, of the end caps at opposite ends of the tubular microporous layer; each end cap comprising at least one impermeable member, each channel having a tapering cross-section which constricts towards a floor of the annular channel, adapted such that on assembly, end regions of the tubular microporous layer are compressed within the channels against the channel-defining wall faces of the end caps; and the filter medium layer forming an impermeable compression seal with the respective channel-defining walls of the end caps.

2. A filter device of claim 1, in which at least one side wall of each annular channel is inclined, adapted such that longitudinally-directed pressure on the tubular microporous layer is converted into laterally-directed compression of walls of the tubular microporous layer.

3. A filter device of claim 2, in which a tie rod is mounted onto and between the end caps and provide axial longitudinally-directed compression force between the end caps, the tie rod being secured at one end to said one end cap and passing through said other end cap at an opposite and threaded end of the tie rod, with a nut screw mounted on the threaded end and adapted to urge the two end caps together toward one-another sufficiently to compress the tubular microporous layer.

4. A filter device of claim 1, in which the tubular micro-porous layer includes reinforcement structure on the normally upstream side thereof.

5. A filter device of claim 4, in which said reinforcement structure includes a coil spring with a natural outside diameter at-least greater than inside diameter of the tubular microporous layer.

6. A filter device of claim 5, in which a post-filter layer is mounted in flow series downstream of the tubular microporous layer.

7. A filter device of claim 6, in which the post-filter layer comprises an open-pored plastic-foam sock.

8. A filter device of claim 6, in which the tubular microporous layer and the post-filter layer are combined into a single one structure, in which the tubular micro-porous layer is formed from open pored metal foam of tubular shape and encloses and supports the post-filter down-stream and is adapted to trap any coalesced droplets of liquid.

9. A filter device of claim 1, in which the tubular microporous layer has a pore size of from about 1 to about 7 microns.

10. A filter device of claim 1, in which the tubular microporous layer has a pore size of from about 7 to about 11 microns.

11. A filter device of claim 1, in which the filter tube has a pore size of from about 11 to about 24 microns.

* * * * *